(12) United States Patent
Kim et al.

(10) Patent No.: US 10,160,857 B2
(45) Date of Patent: Dec. 25, 2018

(54) THERMOPLASTIC RESIN COMPOSITION AND MOLDED ARTICLE MADE THEREFROM

(71) Applicant: Samsung Electronics Co., Ltd., Suwon-si, Gyeonggi-do (KR)

(72) Inventors: Chansu Kim, Seoul (KR); Kyunghae Lee, Incheon (KR); Jun Chwae, Seoul (KR); Mooho Lee, Suwon-si (KR); Kwangmyung Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 250 days.

(21) Appl. No.: 14/830,233

(22) Filed: Aug. 19, 2015

(65) Prior Publication Data

US 2016/0122531 A1 May 5, 2016

(30) Foreign Application Priority Data

Nov. 5, 2014 (KR) .................. 10-2014-0152862

(51) Int. Cl.
*C08L 67/04* (2006.01)
*C08K 9/08* (2006.01)
*C08K 3/36* (2006.01)

(52) U.S. Cl.
CPC ............... *C08L 67/04* (2013.01); *C08K 9/08* (2013.01); *C08K 3/36* (2013.01); *C08K 2201/003* (2013.01); *C08K 2201/011* (2013.01)

(58) Field of Classification Search
CPC .................................. C08K 9/08; C08L 67/04
See application file for complete search history.

(56) References Cited

U.S. PATENT DOCUMENTS

| 5,756,651 | A | 5/1998 | Chen et al. |
| 6,183,928 | B1 * | 2/2001 | Sata ............... G03G 9/08755 430/108.4 |
| 6,472,502 | B1 | 10/2002 | Jurgens et al. |
| 7,589,151 | B2 | 9/2009 | Aoki et al. |
| 7,902,304 | B2 * | 3/2011 | Satoh ............... C08K 9/04 525/450 |
| 8,399,542 | B2 | 3/2013 | Yang et al. |

(Continued)

FOREIGN PATENT DOCUMENTS

| CN | 102167894 A | 1/2013 |
| CN | 103086367 A | 5/2013 |

(Continued)

OTHER PUBLICATIONS

Lonkar et al., "A supramolecular approach toward organo-dispersible graphene and its straightforward polymer nanocomposites", *Journals of Materials Chemistry*, 22:18124-18126 (2012).
Odent et al., "Ultra-tough polylactide-based materials synergistically designed in the presence of rubbery e-caprolactone-based copolyester and silica nanoparticles", *Composites Science and Technology*, 84:86-91 (2013).

(Continued)

*Primary Examiner* — Vickey Nerangis
(74) *Attorney, Agent, or Firm* — Leydig, Voit & Mayer, Ltd.

(57) ABSTRACT

A thermoplastic resin composition including a polylactic acid and organic-inorganic composite particles, wherein the composite particles include an inorganic nanoparticle core and a coating layer formed on the core, wherein the coating layer includes a copolymer, and a molded article made therefrom.

15 Claims, 4 Drawing Sheets

(56) References Cited

U.S. PATENT DOCUMENTS

| | | | | |
|---|---|---|---|---|
| 8,604,123 | B1* | 12/2013 | Weismann | C08L 67/04 428/220 |
| 2011/0313114 | A1 | 12/2011 | Soyama et al. | |
| 2013/0317181 | A1 | 11/2013 | Kim et al. | |
| 2016/0122532 | A1* | 5/2016 | Kim | C08J 3/226 525/450 |

FOREIGN PATENT DOCUMENTS

| | | |
|---|---|---|
| JP | 1999-116785 A | 4/1999 |
| JP | 2004-161790 B2 | 6/2004 |
| JP | 2004-277575 A | 10/2004 |
| JP | 2004-352908 A | 12/2004 |
| JP | 2007-262200 | 3/2006 |
| JP | 4870839 B2 | 6/2009 |
| JP | 2011-195817 B2 | 10/2011 |
| KR | 2010-0016042 A | 2/2010 |
| KR | 10-1158487 B1 | 6/2012 |

OTHER PUBLICATIONS

Sun et al., "Biodegradable "Core-Shell" Rubber Nanoparticles and Their Toughening of Poly(lactides)", *Macromolecules*, 46:9625-9633 (2013).

Xu et al., "In situ Polymerization Approach to Graphene-Reinforced Nylon-6 Composites", *Macromolecules*, 43:6716-6723 (2010).

Yan et al., "Structural characteristics and thermal properties of plasticized poly(L-lactide)-silica nanocomposites synthesized by sol-gel method", *Materials Letters*, 61:2683-2686 (2007).

Imre et al. "Interactions, structure and properties in poly (lactic acid)/thermoplastic polymer blends," *Express Polymer Letters*, vol. 8, No. 1, pp. 2-14 (2014).

Vijayarajan, Shalini, "Continuous Blending Approach in the Manufacture of Epoxidized Soybean-Plasticized Poly (Lactic Acid) Sheets and Films for Packaging Applications", A Thesis Submitted in partial fulfillment of the requirements for a Master of Science degree in Packaging, Michigan State University, Lansing, MI (dated 2013).

\* cited by examiner

THERMOPLASTIC RESIN COMPOSITION AND MOLDED ARTICLE MADE THEREFROM

RELATED APPLICATION

This application claims the benefit of Korean Patent Application No. 10-2014-0152862, filed on Nov. 5, 2014, in the Korean Intellectual Property Office, the disclosure of which is incorporated herein in its entirety by reference.

BACKGROUND

1. Field

The present disclosure relates to thermoplastic resin compositions and molded articles made from the thermoplastic resin compositions.

2. Description of the Related Art

Interest in biodegradable resins, such as aliphatic polyesters, has increased in view of environmental protection. A polylactic acid (or polylactide), which is inexpensive among the biodegradable resins, is prepared from renewable resources such as plants, has significantly lower greenhouse gas emissions than petroleum-based plastics due to biodegradation by microorganisms, and has been used for various applications such as disposable products and medical supplies requiring biodegradability.

A polylactic acid has very high rigidity at room temperature, but thermal deformation may easily occur at a temperature of about 50° C. or more and its mechanical properties are poor, for example, it is easily broken even by low impact physical events. Thus, there is a need to improve the mechanical properties of the polylactic acid.

In order to improve the mechanical properties of the polylactic acid, different types of polymers may be mixed with the polylactic acid, or a low molecular weight organic compound or inorganic particles may be added to the polylactic acid. For example, in a case where a D-type polylactic acid is added to an L-type polylactic acid, heat resistance of the polylactic acid is improved but impact resistance (i.e., resistance to changes that occur as the result of physical events) is not improved at all. In a case where a mineral, such as silica, is added to the polylactic acid, since the interaction with the polylactic acid is insufficient, and thus the effect of improving physical properties is not significant.

Therefore, there is a need to develop a method capable of simultaneously improving the mechanical impact resistance and heat resistance of the polylactic acid.

SUMMARY

Provided is a thermoplastic resin composition, wherein the composition includes:

a polylactic acid; and organic-inorganic composite particles, wherein the composite particles include an inorganic nanoparticle core and a coating layer formed on the core, wherein the coating layer includes a copolymer.

Additionally, provided is a molded article made from a thermoplastic resin composition.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list.

Hereinafter, a thermoplastic resin composition according to exemplary embodiments and a molded article made from the thermoplastic resin composition will be described in more detail.

It will be understood that the terms "comprises," "including" and/or "comprising" used herein specify the presence of stated elements or components without any specific limitations, but do not preclude the presence or addition of one or more other elements or components.

In the present specification, the expression "lactide" includes L-lactide formed of L-lactic acid, D-lactide formed of D-lactic acid, and meso-lactide formed of L-lactic acid and D-lactic acid.

In the present specification, the expression "polylactic acid" denotes all lactic acid polymers including a repeating unit that is formed by ring-opening polymerization of a lactide monomer or by direct polymerization of a lactic acid monomer. The polymer includes a homopolymer or a copolymer, and is not limited thereto. For example, the polymer may be a crude or purified polymer after the completion of the ring-opening polymerization, a polymer included in a liquid or solid resin composition before product molding, or a polymer included in a plastic, film, or textile after the completion of a product molding process.

In the present specification, the expression "organic-inorganic composite particles" denotes composite particles in which an inorganic material and an organic material are linked by a covalent bond.

In the present specification, the expression "grafted" denotes "chemically bonded" or "linked covalently" to a base material or other polymers.

In the present specification, the expression "random copolymer" denotes a polymer in which two or more monomers are randomly linked by a covalent bond.

In the present specification, the expression "block copolymer" denotes a copolymer including two or more homopolymer blocks that are linked by a covalent bond.

In the present specification, the expression "thermoplastic resin" denotes a resin in which flexibility increases as the temperature increases.

A thermoplastic resin composition according to an embodiment of the present invention includes a polylactic acid; and organic-inorganic composite particles, wherein the composite particles include a nanoparticle core and a coating layer formed on the core, wherein the coating layer includes a copolymer. The organic-inorganic composite particles are dispersed in a polylactic acid matrix.

Since the nanoparticle core (i.e., "the core") of the organic-inorganic composite particles, as a rigid core, may act as a support or filler for supporting the shape of the resin composition against external impact, strength of the resin composition may be improved. Also, since the copolymer coating layer may act as a soft shell that absorbs the external impact, impact resistance of the resin composition may be improved. Furthermore, since the copolymer of the copolymer coating layer may physically form stereocomplex crystals with the polylactic acid, heat resistance and mechanical strength of the resin composition may be improved compared, for instance, to a comparative resin as set forth in the Examples.

The copolymer included in the coating layer may be grafted onto the core. Since the copolymer is grafted onto the core, the core and the coating layer may be chemically linked to form composite particles. Thus, the composite particles are distinguished from a configuration in which an inorganic nanoparticle core and a copolymer are physically mixed (non-covalently bonded) to form a copolymer coating layer on the core. For example, the core may have a structure illustrated in FIG. 1 or FIG. 2.

The copolymer included in the coating layer may be a random copolymer or block copolymer. However, the copolymer is not necessarily limited thereto and any copolymer may be used as the copolymer so long as it may be used in the art.

For example, the coating layer may include a random copolymer, and a composition of the coating layer may be easily adjusted according to the required physical properties of the resin composition by adjusting types of two or more monomers forming the random copolymer and their content ratio.

Alternatively or in addition, the coating layer may include a block copolymer which includes a first polymer block grafted on the core and a second polymer block. That is, the coating layer may have a multilayer structure which includes a first coating layer including the first polymer block and a second coating layer including the second polymer block. For example, in an embodiment where the block copolymer further includes a third polymer block in the second polymer block, the coating layer may further include a third coating layer. The coating layer may have a structure illustrated in FIG. 3.

The coating layer forms a soft shell around the core, but the first layer and the second layer of the multi-layer coating, may be respectively classified as a hard shell and a soft shell according to their relative strengths. As used herein the phrase "soft shell" refers to a shell having lower rigidity and higher impact resistance compared to a hard shell. As used herein the phrase "hard shell" refers to a shell having higher rigidity and lower impact resistance compared to the soft shell (See, e.g., the schematics of FIGS. 4 to 6).

The copolymer may be a polyester copolymer including two or more ester structural units. For example, the copolymer may include a first structural unit derived from lactide or lactic acid and a second structural unit derived from an ester compound that is distinguished from the lactide or lactic acid.

The ester compound that is distinguished from the lactide or lactic acid may include a reaction product of aliphatic dicarboxylic acid and diol, a reaction product of aromatic dicarboxylic acid and diol, a reaction product of alicyclic dicarboxylic acid and diol, or a cyclic ester compound.

The aliphatic dicarboxylic acid may be a compound represented by Chemical Formula 1 below.

$$\text{HOOC}-R_1-\text{COOH} \qquad \text{<Chemical Formula 1>}$$

In the above formula, $R_1$ is a covalent bond, or a straight or branched alkylene group having 1 to 20 carbon atoms. For example, $R_1$ is a straight alkylene group having 1 to 15 carbon atoms. For example, $R_1$ is a straight alkylene group having 1 to 10 carbon atoms. For example, $R_1$ is a straight alkylene group having 1 to 6 carbon atoms.

The aromatic dicarboxylic acid may be a compound represented by Chemical Formula 2 below.

$$\text{HOOC}-A_2-Ar_1-A_1-\text{COOH} \qquad \text{<Chemical Formula 2>}$$

In the above formula, $Ar_1$ is an arylene group having 6 to 20 carbon atoms or a heteroarylene group having 2 to 20 carbon atoms and one or more heteroatoms, and $A_1$ and $A_2$ are covalent bonds, or straight or branched alkylene groups having 1 to 5 carbon atoms. For example, $Ar_1$ can be a phenylene group, naphthylene group, or pyridinylene group. At least one hydrogen of the arylene group or the heteroarylene group may be substituted with halogen, or a straight or branched alkyl group having 1 to 10 carbon atoms.

The alicyclic dicarboxylic acid may be a compound represented by Chemical Formula 3 below.

<Chemical Formula 3>

$R_a$, $R_b$, $R_c$, and $R_d$ are each independently hydrogen, an alkyl group having 1 to 10 carbon atoms, an aryl group having 6 to 20 carbon atoms, a cycloalkyl group having 6 to 10 carbon atoms, an alkenyl group having 2 to 10 carbon atoms, or an alkynyl group having 2 to 10 carbon atoms, $B_1$ and $B_2$ are covalent bonds or alkylene groups having 1 to 5 carbon atoms, and $k_1$ and $k_2$ are each independently an integer from 1 to 20. For example, the dicarboxylic acid may include at least one selected from the group consisting of oxalic acid, malonic acid, succinic acid, glutaric acid, adipic acid, pimelic acid, suberic acid, azelaic acid, sebasic acid, phthalic acid, isophthalic acid, terephthalic acid, hexahydrophthalic acid, hexahydroisophthalic acid, naphthalene dicarboxylic acid, and furane-2,5-dicarboxylic acid.

The diol may include ethylene glycol, 1,2-propanediol, 1,3-propanediol, 1,4-butanediol, 1,5-pentanediol, 1,6-hexanediol, 1,7 heptanediol, 1,8-octanediol, 1,9-nonanediol, 1,10-decanediol, neopentyl glycol, diethylene glycol, polyethylene glycol, polypropylene glycol, polytetramethylene ether glycol, 1,2-cyclohexanediol, 1,4-cyclohexanediol, 1,2-cyclohexanedimethanol, and 1,4-cyclohexanedimethanol.

The cyclic ester compound may be lactone having 4 to 20 carbon atoms. For example, the cyclic ester compound may include butyrolactone, valerolactone, caprolactone, glycolide, 1,3-dioxanone, and 1,4-dioxanone. However, the cyclic ester compound is not necessarily limited thereto and any cyclic ester compound may be used so long as it may be used as an ester compound in the art.

Figure 3:
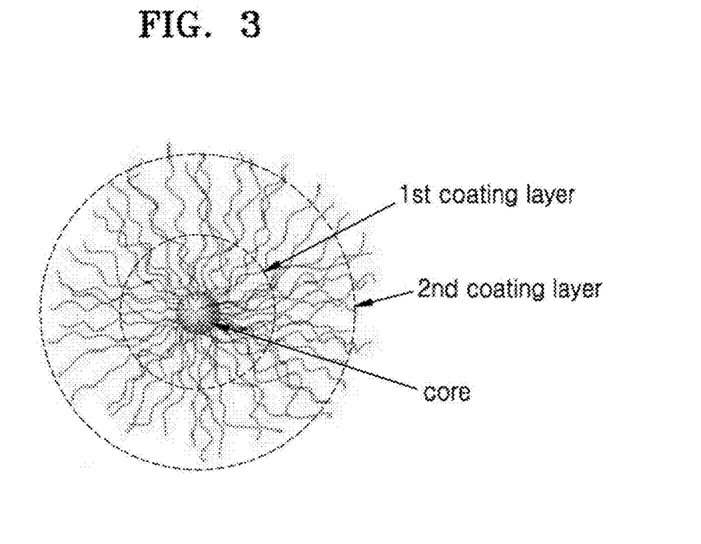
FIG. 3 is an exemplary schematic view of an organic-inorganic composite particle having a plurality of coating layers.

For example, as illustrated in FIG. 3, the coating layer may have a configuration in which a polycaprolactone block derived from the cyclic ester compound is disposed in the first coating layer and a polylactic acid block derived from the lactide or lactic acid is disposed in the second coating layer. In this embodiment, when the polylactic acid block of the second coating layer is D-type and the polylactic acid of the matrix is L-type, the organic-inorganic composite particles and the matrix are more strongly bound together by forming a stereocomplex therebetween, and thus, the impact resistance and heat resistance may be improved. Additionally, the coating layer may have a configuration in which a polycaprolactone block derived from the cyclic ester compound is disposed in the second coating layer and a polylactic acid block derived from the lactide or lactic acid is disposed in the first coating layer. In this embodiment, since the polylactic acid block of the first coating layer connects the polylactic acid block of the second coating layer with the inorganic nanoparticles of the core, the polylactic acid block of the first coating layer may act as a buffer to mitigate rapid changes in physical properties therebetween, and thus, external impact may be easily absorbed.

In the thermoplastic resin composition, the copolymer may include about 20 wt % to about 80 wt % of the first structural unit derived from lactide or lactic acid and about 20 wt % to about 80 wt % of the second structural unit derived from an ester compound that is distinguished from the first structural unit based on a total weight of the copolymer. For example, the copolymer may include about 20 wt % to about 70 wt % of the first structural unit and about 30 wt % to about 80 wt % of the second structural unit. For example, the copolymer may include about 30 wt % to about 70 wt % of the first structural unit and about 30 wt % to about 70 wt % of the second structural unit. For example, the copolymer may include about 20 wt % to about 60 wt % of the first structural unit and about 40 wt % to about 80 wt % of the second structural unit. For example, the copolymer may include about 20 wt % to about 50 wt % of the first structural unit and about 50 wt % to about 80 wt % of the second structural unit.

When an amount of the first structural unit is in a range of about 20 wt % to about 80 wt % and an amount of the second structural unit is in a range of about 20 wt % to about 80 wt %, the impact resistance of the thermoplastic resin composition may be further improved and the heat resistance may be maintained or improved. If the amount of the second structural unit is excessively large, the copolymer may not well mixed with a polylactic acid resin.

The number average molecular weight of the copolymer may be about 10,000 g/mol or more. For example, the number-average molecular weight of the copolymer may be in a range of about 10,000 g/mol to about 150,000 g/mol. For example, the number-average molecular weight of the copolymer may be in a range of about 20,000 g/mol to about 150,000 g/mol. For example, the number-average molecular weight of the copolymer may be in a range of about 30,000 g/mol to about 150,000 g/mol. For example, the number-average molecular weight of the copolymer may be in a range of about 30,000 g/mol to about 100,000 g/mol. For example, the number-average molecular weight of the copolymer may be in a range of about 30,000 g/mol to about 70,000 g/mol. The number-average molecular weight range of the copolymer affects the impact resistance of the copolymer For example, if the number-average molecular weight of the copolymer is excessively low, an effect of improving the impact resistance may be insignificant, and if the number-average molecular weight of the copolymer is excessively high, preparation may be difficult.

The inorganic nanoparticles may be single metal nanoparticles or metal oxide nanoparticles. The metal may be an element belonging to Groups 3 to 15 of the Periodic Table of Elements. Since the metal oxide nanoparticles may include a hydroxy group on surfaces of the particles, the metal oxide nanoparticles may form a copolymer coating layer on the inorganic nanoparticles by reacting with a monomer.

For example, the metal oxide may include at least one selected from the group consisting of silicon dioxide ($SiO_2$), titanium dioxide ($TiO_2$), cerium oxide ($Ce_2O_3$), zinc oxide (ZnO), zirconium oxide ($ZrO_2$), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxide(II) ($Fe_3O_4$), iron oxide(III) ($Fe_2O_3$), hafnium oxide ($HfO_2$), lanthanum oxide ($La_2O_3$), magnesium oxide (MgO), neodymium oxide ($Nd_2O_3$), samarium oxide ($Sm_2O_3$), antimony trioxide ($Sb_2O_3$), selenium trioxide ($Se_2O_3$), tin oxide ($SnO_2$), and tungsten trioxide ($WO_3$). However, the metal oxide is not necessarily limited thereto, and any metal oxide may be used so long as it is a metal oxide including a hydroxy group on the surface thereof.

The particle diameter of the inorganic nanoparticles may be less than about 100 nm. The particle diameter of the inorganic nanoparticles refers to the median particle diameter (D50) of the inorganic nanoparticles. The median particle diameter (D50) of the inorganic nanoparticles may be measured by light scattering analysis, and a D50 (median) particle size may be calculated. Devices suitable for measuring particle sizes, such as the Partica LA-950 Particle Size Distribution Analyzer, commercially available from Horiba, Ltd., Japan, are known in the art. For example, the particle diameter of the inorganic nanoparticles may be in a range of about 1 nm to about 100 nm. For example, the particle diameter of the inorganic nanoparticles may be in a range of about 2 nm to about 80 nm. For example, the particle diameter of the inorganic nanoparticles may be in a range of about 5 nm to about 50 nm. For example, the particle diameter of the inorganic nanoparticles may be in a range of about 5 nm to about 40 nm. For example, the particle diameter of the inorganic nanoparticles may be in a range of about 5 nm to about 30 nm. For example, the particle diameter of the inorganic nanoparticles may be in a range of about 5 nm to about 20 nm. More improved impact resistance may be obtained in compositions comprising inorganic nanoparticles in the above particle diameter ranges.

An amount of the inorganic nanoparticles may be in a range of about 0.1 wt % to about 10 wt % based on a total weight of the organic-inorganic composite particles. For example, the amount of the inorganic nanoparticles may be in a range of about 1 wt % to about 10 wt % based on the total weight of the organic-inorganic composite particles. For example, the amount of the inorganic nanoparticles may be in a range of about 1 wt % to about 8 wt % based on the total weight of the organic-inorganic composite particles. For example, the amount of the inorganic nanoparticles may be in a range of about 1 wt % to about 6 wt % based on the total weight of the organic-inorganic composite particles.

For example, the amount of the inorganic nanoparticles may be in a range of about 1 wt % to about 4 wt % based on the total weight of the organic-inorganic composite particles. In a case where the amount of the inorganic nanoparticles is greater than about 10 wt %, it may be difficult to increase the number average molecular weight of the copolymer to about 10,000 g/mol or more. In a case where the amount of the inorganic nanoparticles is less than about 1 wt %, since the amount of the inorganic nanoparticles is excessively low, it may be difficult to act as a support against any external impact that occurs to the resin.

An amount of the organic-inorganic composite particles may be in a range of about 5 wt % to about 40 wt % based on a total weight of the thermoplastic resin composition. For example, the amount of the organic-inorganic composite particles may be in a range of about 10 wt % to about 30 wt % based on the total weight of the thermoplastic resin composition. For example, the amount of the organic-inorganic composite particles may be in a range of about 15 wt % to about 25 wt % based on the total weight of the thermoplastic resin composition. Within the ranges set forth above with respect to the organic-inorganic composite particles, the impact resistance and heat resistance of the thermoplastic resin composition may be improved. In a case where the amount of the organic-inorganic composite particles is excessively small, the effect of improving the impact resistance may be insignificant, and in a case where the amount is excessively large, the resin composition may be softened.

Figure 1:
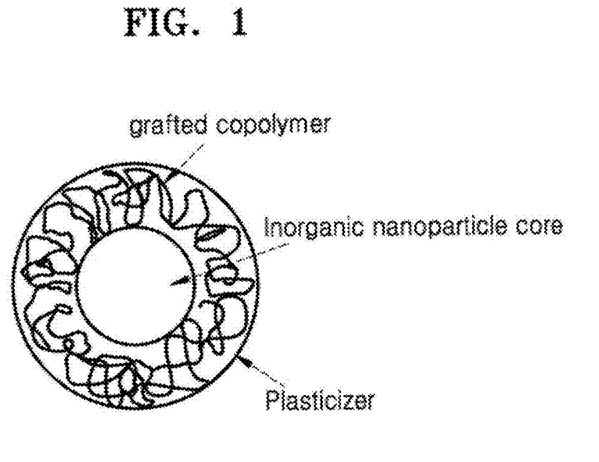
FIG. 1 is an exemplary schematic view of an organic-inorganic composite particle.
Figure 2:
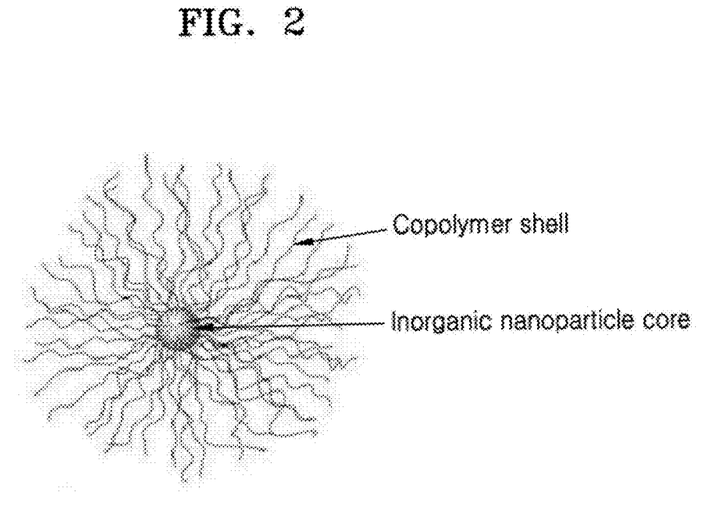
FIG. 2 is an exemplary schematic view of an organic-inorganic composite particle.

The thermoplastic resin composition may further include a plasticizer. In embodiments where the resin composition further includes the plasticizer, the dispersion of impact is improved due to polymer deformation. Therefore, an external impact may be more easily dispersed or absorbed within the resin composition since the polymer can be more easily deformed by the presence of plasticizer. Thus, the impact resistance may be further improved. As illustrated in FIG. 1, the plasticizer may help to absorb the external impact while being disposed in the copolymer coating layer of the organic-inorganic composite particles or being present at an interface between the organic-inorganic composite particles and the polylactic acid matrix. Further, since a reactive plasticizer, such as epoxidized soybean oil, may react with the polylactic acid matrix to form bonds between the organic-inorganic composite particles and the polylactic acid matrix, the reactive plasticizer may improve the heat resistance of the thermoplastic resin composition.

A synthetic plasticizer and/or a vegetable plasticizer may be used. An amount of the plasticizer may be in a range of about 1 wt % to about 10 wt % based on the total weight of the thermoplastic resin composition. For example, the amount of the plasticizer may be in a range of about 1 wt % to about 8 wt % based on the total weight of the thermoplastic resin composition. For example, the amount of the plasticizer may be in a range of about 2 wt % to about 6 wt % based on the total weight of the thermoplastic resin composition. In a case where the amount of the plasticizer is included within the above range, the impact resistance of the resin composition is improved, limitations, such as the softening of the resin composition or the elution of the plasticizer on the surface of the resin composition, may be prevented, and the heat resistance and flame retardant may be maintained and improved.

The synthetic plasticizer may include a phthalate-based plasticizer, an adipate-based plasticizer, a silicon-based plasticizer, a mixture of trimethylolpropane-tri(2-ethylhexanoate) and benzoic acid, a mixture of 2,2-bis(2-ethylhexa-noyloxymethyl)butyl ester and 2-ethylhexanoic acid, a mixture of 2,2-bis(bezoyloxy-methyl)butyl ester and trimethylol propane-tribenzoate, a mixed alcohol ester, a citric acid ester, or a combination thereof.

Specific examples of the synthetic plasticizer may be dioctylterephthalate, dioctyl(nonyl)terephthalate, a mixture of trimethylolpropane-tri(2-ethylhexanoate) and benzoic acid, a mixture of 2,2-bis(2-ethylhexa-noyloxymethyl)butyl ester and 2-ethylhexanoic acid, a mixture of 2,2-bis(bezoy-loxy-methyl)butyl ester and trimethylol propane-tribenzoate, a mixed alcohol ester, a citric acid ester, or a combination thereof.

The vegetable plasticizer may be vegetable oil or modified vegetable oil. The modified vegetable oil is a reaction product of vegetable oil and other monomers. The modification, for example, may include expoxydization, maleinization, or acrylation. The vegetable oil may include soybean oil, linseed oil, palm oil, or a combination thereof. The modified vegetable oil may include epoxidized soybean oil, acrylated soybean oil, maleated soybean oil, acrylated-epoxydized soybean oil, or a combination thereof.

The thermoplastic resin composition may further include a nucleating agent. By further including the nucleating agent, the heat resistance of the thermoplastic resin composition may be further improved since the nucleating agents improves the crystallization rate of the polylactic acid.

An amount of the nucleating agent may be in a range of about 0.1 wt % to about 10 wt % based on the total weight of the thermoplastic resin composition. For example, the amount of the nucleating agent may be in a range of about 0.1 wt % to about 6 wt % based on the total weight of the thermoplastic resin composition. For example, the amount of the nucleating agent may be in a range of about 0.5 wt % to about 4 wt % based on the total weight of the thermoplastic resin composition. In a case where the amount of the nucleating agent is included within the above range, the heat resistance of the resin composition may be improved without reduction of the impact resistance.

An average particle diameter of the nucleating agent may be about 100 µm or less. For example, the average particle diameter of the nucleating agent may be in a range of about 1 µm to about 100 µm. For example, the average particle diameter of the nucleating agent may be in a range of about 1 µm to about 50 µm or less. For example, the average particle diameter of the nucleating agent may be in a range of about 1 µm to about 30 µm or less. The heat resistance of the resin composition may be further improved by using the nucleating agent having the above particle diameter range.

Any nucleating agent of a resin composition may be used, including any inorganic-based nucleating agent or organic-based nucleating agent. Specific examples of the inorganic-based nucleating agent may be talc, kaolinite, montmorillonite, synthetic mica, clay, zeolite, silica, graphite, carbon black, zinc oxide, magnesium oxide, titanium oxide, calcium sulfide, boron nitride, calcium carbonate, barium sulfate, aluminum oxide, neodymium oxide, and a metal salt of phenylphosphonate. For example, talc, mica, and silica may be used. In particular, talc may be used.

Specific examples of the organic-based nucleating agent may be organic carboxylic acid metal salts such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate, and sodium cyclohexane carboxylate; organic sulfonates such as sodium p-toluene sulfonate and sodium sulfoisophthalate; carboxylic acid amides such as stearic acid amide, ethylene bislauric acid amide, palmitic acid amide, hydroxystearic acid amide, erucic acid amide, and tris(t-butylamide) trimesate; low-density polyethylene, high-density polyethylene, polypropylene, polyisopropylene, polybutene, poly-4-methylpentene, poly-3-methylbutene-1, polyvinylcycloalkane, polyvinyltrialkylsilane; sodium salts or potassium salts of a polymer having a carboxyl group (so-called ionomers) such as a sodium salt of an ethylene-acrylic acid or a methacrylic acid copolymer and a sodium salt of a styrene-maleic anhydride copolymer; benzylidene sorbitol and a derivative thereof; phosphate ester metal salts such as ADEKA products NA-11 and NA-71; and 2,2-methylbis(4,6-di-t-butylphenyl)sodium. For example, ethylene bislauric acid amide, benzylidene sorbitol and a derivative thereof, organic carboxylic acid metal salts, carboxylic acid amides, and phosphate ester metal salts, such as ADEKA products NA-11 and NA-71, may be used. One of the above organic-based nucleating agents may be used alone as the nucleating agent, or two or more thereof may be combined to be used as the nucleating agent.

In the thermoplastic resin composition, about 40 wt % to about 93 wt % of the polylactic acid, about 5 wt % to about 40 wt % of the organic-inorganic composite particles, about 1 wt % to about 10 wt % of the plasticizer, and about 0.1 wt % to about 10 wt % of the nucleating agent may be included based on the total weight of the thermoplastic resin composition. The thermoplastic resin composition having the above composition may provide more improved impact resistance and heat resistance.

The polylactic acid used as the matrix resin in the thermoplastic resin composition is an aliphatic polyester including a repeating unit of Chemical Formula 4 below.

<Chemical Formula 4>

The acidity of the polylactic acid may be about 50 meq/kg or less. Although the acidity of the polylactic acid is not necessarily limited to the above range, more improved physical properties may be provided within the above acidity range. For example, the acidity of the polylactic acid may be in a range of about 1 meq/kg to about 50 meq/kg. For example, the acidity of the polylactic acid may be in a range of about 1 meq/kg to about 30 meq/kg. For example, the acidity of the polylactic acid may be in a range of about 1 meq/kg to about 10 meq/kg. For example, the acidity of the polylactic acid may be in a range of about 2 meq/kg to about 5 meq/kg.

The weight-average molecular weight of the polylactic acid may be in a range of about 10,000 g/mol to about 500,000 g/mol. For example, the weight-average molecular weight of the polylactic acid may be in a range of about 100,000 g/mol to about 300,000 g/mol. In a case where the weight-average molecular weight of the polylactic acid is less than about 10,000 g/mol, mechanical properties of the thermoplastic resin composition may deteriorate, and in a case where the weight-average molecular weight is greater than about 500,000 g/mol, processing may be difficult.

The optical purity of the polylactic acid may be about 90% or more. For example, the optical purity of the polylactic acid may be about 93% or more. For example, the optical purity of the polylactic acid may be about 95% or more. For example, the optical purity of the polylactic acid may be about 97% or more. When the optical purity of the polylactic acid is about 90% or less, the mechanical properties may deteriorate.

The polylactic acid used as the matrix may be a polylactic acid that is prepared from L-lactide or L-lactic acid. The above polylactic acid may be an optical isomer that is different from (e.g., opposite to) the polylactic acid included in the organic-inorganic composite particles. For example, in a case where the polylactic acid matrix is L-type, the polylactic acid included in the organic-inorganic composite particles may be D-type. Further, in a case where the polylactic acid matrix is D-type, the polylactic acid included in the organic-inorganic composite particles may be L-type. Since their three-dimensional structures are opposite to each other, stronger binding may be obtained.

The thermoplastic resin composition may be a liquid phase or solid phase, and may be a composition before molding into a final product, or may be a molded article, a film, or a textile after molding into the final product. The molded article, textile, or film may be manufactured by a typical method according to the type of each product.

The thermoplastic resin composition may further include additives of the type generally used in a typical resin composition For example, the additive may be a filler, a terminal blocking agent, a metal deactivator, an antioxidant, a heat stabilizer, an ultraviolet absorber, a lubricant, a tackfier, a cross-linking agent, a viscosity modifier, an antistatic agent, a flavouring agent, an antibacterial agent, a dispersant, and a polymerization inhibitor, may be added within a range that does not adversely affect the physical properties of the resin composition.

Further, the thermoplastic resin composition may additionally include a filler. For example, an inorganic filler, such as talc, wollastonite, mica, clay, montmorillonite, smectite, kaoline, zeolite (aluminum silicate), and anhydrous amorphous aluminum silicate obtained by performing an acid treatment and a heat treatment on zeolite, may be used as the filler. In a case where the filler is included, an amount of the filler in the resin composition may be in a range of about 1 wt % to about 20 wt % based on the total weight of the resin composition in order to maintain impact strength of the molded article.

The thermoplastic resin composition may include a carbodiimide compound, such as a polycarbodiimide compound or a monocarbodiimide compound, as the terminal blocking agent. Since the above compound reacts with a part or all of a terminal carboxyl group of a polylactic acid resin to block side reactions such as hydrolysis, water resistance of the molded article including the thermoplastic resin composition may be improved. Thus, durability of the molded article including the thermoplastic resin composition under high temperature and high humidity environments may be improved.

The polycarbodiimide compound, for example, may include poly(4,4'-diphenylmethane carbodiimide), poly(4,4'-dicyclohexylmethane carbodiimide), poly(1,3,5-triisopropyl benzene) polycarbodiimide, and poly(1,3,5-triisopropylbenzene and 1,5-diisopropylbenzene)polycarbodiimide.

The monocarbodiimide compound, for example, may include N,N'-di-2,6-diisopropylphenyl carbodiimide.

An amount of the carbodiimide compound may be in a range of about 0.1 wt % to about 3 wt % based on the total weight of the thermoplastic resin composition. An amount of a carbodiimide compound less than about 0.1 wt %, may be insufficient to improve the durability of the molded article. When the amount of the carbodiimide compound is greater than about 3 wt %, mechanical strength of the molded article may deteriorate.

The thermoplastic resin composition may include a stabilizer or a colorant in order to stabilize the molecular weight or color during molding. A phosphorus-based stabilizer, a hindered phenol-based stabilizer, an ultraviolet absorber, a heat stabilizer, and an antistatic agent may be used as the stabilizer.

Phosphorous acid, phosphoric acid, phosphonic acid, esters thereof (phosphite compound, phosphate compound, phosphonite compound, phosphonate compound, etc.), and tertiary phosphine may be used as the phosphorus-based stabilizer.

Sandostab P-EPQ (Clariant) and Irgafos P-EPQ (CIBA SPECIALTY CHEMICALS) may be used as a stabilizer including the phosphonite compound as a main component.

PEP-8 (Asahi Denka Kogyo), JPP681S (Tohoku Chemical Co., Ltd.), PEP-24G (Asahi Denka Kogyo), Alkanox P-24 (Great Lakes), Ultranox P626 (GE Specialty Chemicals), Doverphos S-9432 (Dover Chemical), Irgaofos126, 126 FF (CIBA SPECIALTY CHEMICALS), PEP-36 (Asahi Denka Kogyo), PEP-45 (Asahi Denka Kogyo), and Doverphos S-9228 (Dover Chemical) may be used as a stabilizer including the phosphite compound as a main component.

A hindered phenol-based stabilizer (antioxidant) may be a general compound used in a typical resin. For example, 3,9-bis[2-{3-(3-t-butyl-4-hydroxy-5-methylphenyl)propionyloxy}-1,1-dimethylethyl]-2,4,8,10-tetraoxaspiro[5,5]undecane may be used as the hindered phenol-based stabilizer. However, the hindered phenol-based stabilizer is not limited thereto, and any hindered phenol-based compound may be used as the hindered phenol-based stabilizer so long as it is used as an oxidation stabilizer of a resin composition in the art.

An amount of the phosphorus-based stabilizer and the hindered phenol-based antioxidant in the resin composition may be in a range of about 0.005 wt % to about 1 wt % based on the total weight of the resin composition.

The thermoplastic resin composition may include an ultraviolet absorber. The deterioration of weather resistance of the molded article due to the effect of a rubber component or flame retardant may be suppressed by including the ultraviolet absorber. A benzophenone-based ultraviolet absorber, a benzotriazole-based ultraviolet absorber, a hydroxyphenyltriazine-based ultraviolet absorber, a cyclic imino ester-based ultraviolet absorber, and a cyanoacrylate-based ultraviolet absorber may be used as the ultraviolet absorber. An amount of the ultraviolet absorber in the thermoplastic resin composition may be in a range of about 0.01 wt % to about 2 wt % based on the total weight of the resin composition.

The thermoplastic resin composition may include a dye or pigment as a colorant in order to provide various colors to the molded article.

The thermoplastic resin composition may include an antistatic agent in order to provide antistatic performance to the molded article.

The thermoplastic resin composition may contain a, a flow modifier, an antibacterial agent, a dispersant such as liquid paraffin, a photocatalytic antifouling agent, an IR (infra-red ray) absorber, and a photochromic agent. The thermoplastic resin composition may also contain additional resins (e.g., additional thermoplastic resins).

An impact strength of the thermoplastic resin composition measured at room temperature according to the ASTM D256 method may be about 100 J/m or more. For example, the impact strength of the thermoplastic resin composition may be in a range of about 100 J/m to about 500 J/m, such as about 200 J/m to about 500 J/m, about 300 J/m to about 500 J/m, or even about 400 J/m to about 500 J/m. Since the thermoplastic resin composition may have an impact strength of about 100 J/m or more, an improved durability may be provided to an article prepared using the thermoplastic resin composition as compared, for instance, to an article made from a comparative resin set forth in the Examples.

A heat distortion temperature (HDT) of the thermoplastic resin composition measured under a load of about 0.45 MPa according to the ASTM D648 method may be about 80° C. or more. For example, the HDT of the thermoplastic resin composition may be in a range of about 80° C. to about 150° C., such as about 90° C. to about 150° C., about 100° C. to about 150° C., or even about 110° C. to about 150° C. Since the thermoplastic resin composition may have an HDT of about 80° C. or more, an improved durability may be provided to an article prepared using the thermoplastic resin composition as compared, for instance, to an article made from a comparative resin set forth in the Examples.

A molded article according to another embodiment of the present invention may be made from the above-described thermoplastic resin composition.

The thermoplastic resin composition may be obtained by melt-kneading the above each component with various types of extruders, a Banbury mixer, a kneader, a continuous kneader, and a roll. During the kneading, the above each component may be added collectively or dividedly. The thermoplastic resin composition thus prepared may be used to obtain a molded article by a known molding method such as injection molding, press molding, calendar molding, T-die extrusion molding, hollow sheet extrusion molding, foam sheet extrusion molding, inflation molding, lamination molding, vacuum molding, profile extrusion molding, or a combined method thereof.

Also, in situations where a kneader, such as a kneading extruder and a Banbury mixer, is connected to a calendar molding machine, T-die extrusion molding machine, or inflation molding machine, the thermoplastic resin composition is not first prepared, but a molded article may be prepared at the same time when the thermoplastic resin composition is obtained by the connected kneader.

The molded article prepared using the thermoplastic resin composition may be used for various applications without any restriction. For example, the molded article may be used for medical use such as a vascular graft, a cell carrier, a drug carrier, and a gene carrier. Further, the molded article may be used as interior and exterior materials of various general-purpose items. For example, the molded article may be used as interior and exterior materials of household appliances, communication equipment, and industrial equipment. Further, the molded article may be used in generic product areas such as cases such as a relay case, a wafer case, a reticle case, and a mask case; trays such as a liquid crystal tray, a chip tray, a hard disk tray, a charge coupled device (CCD) tray, an integrated circuit (IC) tray, an organic electroluminescence (EL) tray, an optical pickup tray, and a light-emitting diode (LED) tray; carriers such as an IC carrier;

films such as a polarizing film, a light guide plate, protective films for various lenses, a sheet used during cutting a polarizing film, and a sheet used in a clean room such as a partition plate; an inner member of an automatic vending machine, antistatic bags used in a liquid crystal panel, a hard disk, and a plasma panel, corrugated plastic, carrying cases for a liquid crystal panel, a liquid crystal cell, and a plasma panel, and other members for carrying various parts.

The present disclosure is described in more detail according to the examples set forth below. However, the examples only exemplify the present disclosure, and the scope of the present disclosure is not limited thereto.

Preparation of Organic-Inorganic Composite Particles

Synthesis Example 1: Preparation of Random Copolymer Coating Layer

About 30 ml of anhydrous toluene and about 20 g of a starting material including about 0.6 g of fumed silica (Sigma-Aldrich S5130) having an average particle diameter of about 7 nm, about 15 g of ε-caprolactone (CLN), and about 4.4 g of D-lactide (DLD) were introduced into a 250 ml flask equipped with a stirrer, a heating device, a condenser, and a vacuum unit in a nitrogen atmosphere, and the temperature was then increased to about 120° C. while stirring at about 50 rpm. Then, tin(II) 2-ethylhexanoate $(Sn(Oct)_2)$, as a catalyst, was further added in an amount of about 0.1 wt % (20 g×0.001=20 mg) of the starting material and reacted for about 12 hours. A reaction product was added to cold methanol having about 10 times the volume of the reaction product to precipitate silica having a copolymer coating layer formed thereon, and the solution was filtered to remove unreacted reactants. Organic-inorganic composite particles were obtained by drying the solid resultant product at about 40° C. for about 24 hours by depressurization to about 10 Torr. The organic-inorganic composite particles were obtained in which a single random copolymer coating layer derived from lactic acid and caprolactone was formed on the silica core. A number-average molecular weight of the random copolymer was about 38,000 g/mol.

Figure 4:
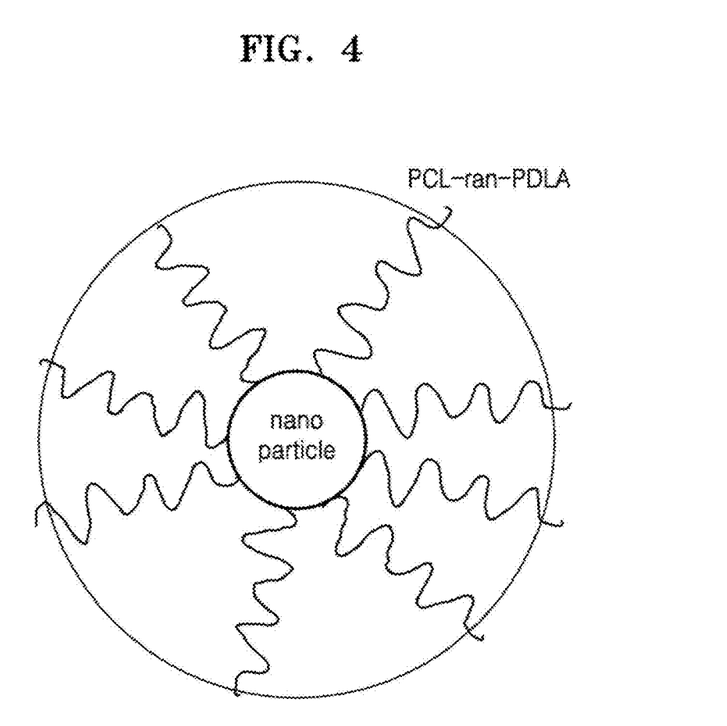
FIG. 4 is an exemplary schematic view of organic-inorganic composite particles having a core-hard/soft shell structure which are prepared in Synthesis Examples 1 to 3.

As illustrated in FIG. 4, the organic-inorganic composite particles having an inorganic nanoparticle core-soft/hard shell structure were obtained.

Synthesis Example 2: Preparation of Random Copolymer Coating Layer

Polymerization was performed in the same manner as in Synthesis Example 1 except that the composition of the starting material was changed to about 0.6 g of fumed silica, about 10 g of ε-caprolactone, and about 9.4 g of DLD. A number-average molecular weight of the random copolymer thus obtained was about 40,600 g/mol.

Synthesis Example 3: Preparation of Random Copolymer Coating Layer

Polymerization was performed in the same manner as in Synthesis Example 1 except that the composition of the starting material was changed to about 0.6 g of fumed silica, about 5 g of ε-caprolactone, and about 14.4 g of DLD. A number-average molecular weight of the random copolymer thus obtained was about 34,500 g/mol.

Synthesis Example 4: Preparation of Random Copolymer Coating Layer

About 30 ml of anhydrous toluene and about 10 g of a starting material including about 0.6 g of fumed silica (Sigma-Aldrich S5130) having an average particle diameter of about 7 nm and about 9.4 g of D-lactide (DLD) were introduced into a 250 ml flask equipped with a stirrer, a heating device, a condenser, and a vacuum unit in a nitrogen atmosphere, and the temperature was then increased to about 120° C. while stirring at about 50 rpm. Then, tin(II) 2-ethylhexanoate $(Sn(Oct)_2)$, as a catalyst, was further added in an amount of about 0.1 wt % (10 g×0.001=10 mg) of the starting material and reacted for about 6 hours ($1^{st}$ step reaction). Then, about 10 g of ε-caprolactone and about 10 mg of tin(II) 2-ethylhexanoate $(Sn(Oct)_2)$, as a catalyst, were further added and reacted for about 6 hours ($2^{nd}$ step reaction). A reaction product was added to cold methanol having about 10 times the volume of the reaction product to precipitate silica having a copolymer coating layer formed thereon, and the solution was filtered to remove unreacted reactants. Organic-inorganic composite particles were obtained by drying the solid resultant product at about 40° C. for about 24 hours by depressurization to about 10 Torr.

The organic-inorganic composite particles were obtained in which a block copolymer coating layer, which includes a first coating layer including a structural unit derived from D-lactic acid and a second coating layer including a structural unit derived from caprolactone, was formed on the silica core. A number-average molecular weight of the block copolymer thus obtained was about 40,300 g/mol.

Figure 5:
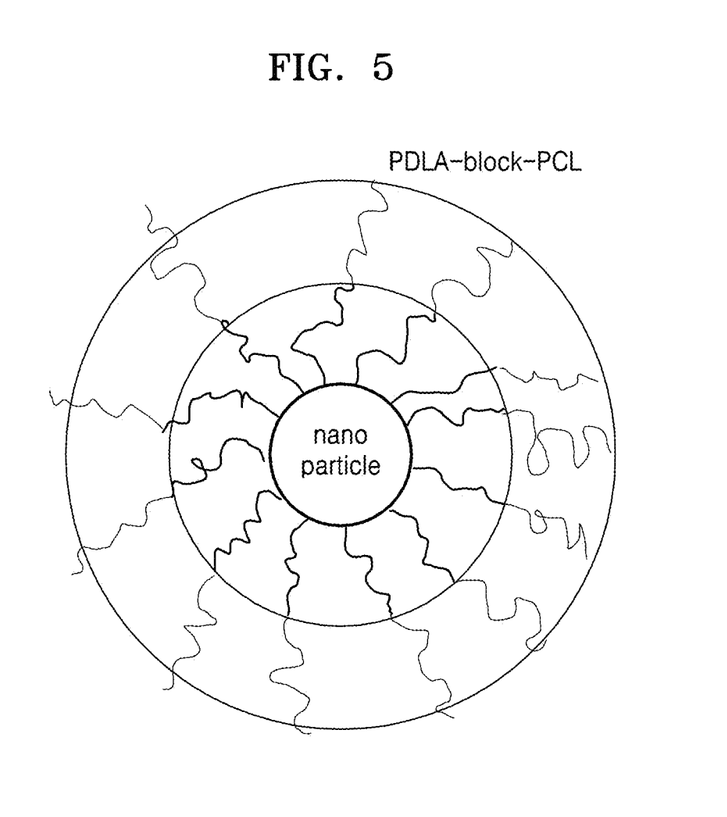
FIG. 5 is an exemplary schematic view of organic-inorganic composite particles having a core-soft shell-hard shell structure which are prepared in Synthesis Examples 4 to 6.

As illustrated in FIG. 5, the organic-inorganic composite particles having an inorganic nanoparticle core-hard shell-soft shell structure were obtained.

Synthesis Example 5: Preparation of Block Copolymer Coating Layer

Polymerization was performed in the same manner as in Synthesis Example 4 except that the composition of the starting material was changed to about 0.6 g of fumed silica and about 4.4 g of DLD in the 1st step reaction and about 15 g of ε-caprolactone in the $2^{nd}$ step reaction. A number-average molecular weight of the block copolymer thus obtained was about 46,200 g/mol.

Synthesis Example 6: Preparation of Block Copolymer Coating Layer

Polymerization was performed in the same manner as in Synthesis Example 4 except that the composition of the starting material was changed to about 0.6 g of fumed silica and about 14.4 g of DLD in the 1st step reaction and about 5 g of ε-caprolactone in the $2^{nd}$ step reaction. A number-average molecular weight of the block copolymer thus obtained was about 32,700 g/mol.

Synthesis Example 7: Preparation of Block Copolymer Coating Layer

Polymerization was performed in the same manner as in Synthesis Example 4 except that the composition of the starting material was changed to about 0.6 g of fumed silica and about 10 g of ε-caprolactone in the 1st step reaction and about 9.4 g of DLD in the $2^{nd}$ step reaction. Organic-inorganic composite particles were obtained in which a block copolymer coating layer, which includes a first coating layer including a structural unit derived from ε-caprolactone and a second coating layer including a structural unit derived from DLD, was formed on the silica core. A number-average molecular weight of the block copolymer thus obtained was about 40,000 g/mol.

Figure 6:
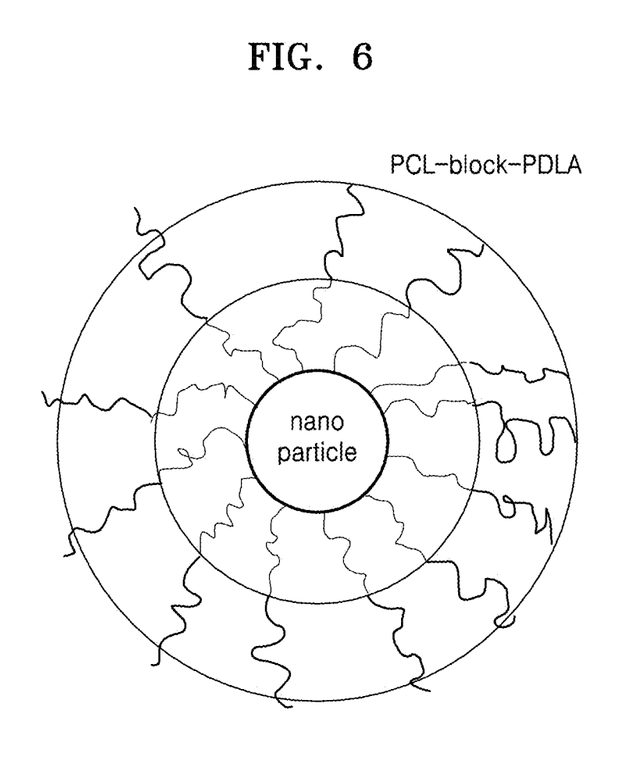
FIG. 6 is an exemplary schematic view of organic-inorganic composite particles having a core-hard shell-soft shell structure which are prepared in Synthesis Examples 7 to 9.

As illustrated in FIG. 6, the organic-inorganic composite particles having an inorganic nanoparticle core-soft shell-hard shell structure were obtained.

Synthesis Example 8: Preparation of Block Copolymer Coating Layer

Polymerization was performed in the same manner as in Synthesis Example 4 except that the composition of the starting material was changed to about 0.6 g of fumed silica and about 15 g of ε-caprolactone in the 1st step reaction and about 4.4 g of DLD in the $2^{nd}$ step reaction. A number-average molecular weight of the block copolymer thus obtained was about 51,600 g/mol.

Synthesis Example 9: Preparation of Block Copolymer Coating Layer

Polymerization was performed in the same manner as in Synthesis Example 4 except that the composition of the starting material was changed to about 0.6 g of fumed silica and about 5 g of ε-caprolactone in the 1st step reaction and about 14.4 g of DLD in the $2^{nd}$ step reaction. A number-average molecular weight of the block copolymer thus obtained was about 47,700 g/mol.

Synthesis Example 10: Changes in Silica Particle Diameter

Polymerization was performed in the same manner as in Synthesis Example 1 except that silica having a particle diameter of about 200 nm to about 300 nm was used instead of the silica having a particle diameter of about 7 nm that was used in Synthesis Example 1. A number-average molecular weight of the random copolymer thus obtained was about 64,100 g/mol.

Comparative Synthesis Example 1: Preparation of Homopolymer Coating Layer

Polymerization was performed in the same manner as in Synthesis Example 1 except that the composition of the starting material was changed to about 0.6 g of fumed silica and about 19.4 g of DLD. Organic-inorganic composite particles were obtained in which a homopolymer coating layer derived from DLD was formed on the silica core. A number-average molecular weight of the homopolymer thus obtained was about 41,000 g/mol.

Comparative Synthesis Example 2: Preparation of Homopolymer Coating Layer

Polymerization was performed in the same manner as in Synthesis Example 1 except that the composition of the starting material was changed to about 0.6 g of fumed silica and about 19.4 g of ε-caprolactone. Organic-inorganic composite particles were obtained in which a homopolymer coating layer derived from ε-caprolactone was formed on the silica core. A number-average molecular weight of the homopolymer thus obtained was about 67,300 g/mol.

Comparative Synthesis Example 3: Preparation of Random Copolymer

Polymerization was performed in the same manner as in Synthesis Example 1 except that the composition of the starting material was changed to about 15 g of ε-caprolactone and about 5 g of DLD without fumed silica. A number-average molecular weight of the random copolymer thus obtained was about 52,000 g/mol.

Comparative Synthesis Example 4: Preparation of Random Copolymer

Polymerization was performed in the same manner as in Synthesis Example 1 except that the composition of the starting material was changed to about 10 g of ε-caprolactone and about 10 g of DLD without fumed silica. A number-average molecular weight of the random copolymer thus obtained was about 60,400 g/mol.

Comparative Synthesis Example 5: Preparation of Block Copolymer

Polymerization was performed in the same manner as in Synthesis Example 4 except that the composition of the starting material was changed to about 15 g of ε-caprolactone without fumed silica in the 1st step reaction and about 5 g of DLD in the $2^{nd}$ step reaction. A number-average molecular weight of the block copolymer thus obtained was about 49,000 g/mol.

Comparative Synthesis Example 6: Preparation of Block Copolymer

Polymerization was performed in the same manner as in Synthesis Example 4 except that the composition of the starting material was changed to about 10 g of ε-caprolactone without fumed silica in the 1st step reaction and about 10 g of DLD in the $2^{nd}$ step reaction. A number-average molecular weight of the block copolymer thus obtained was about 49,200 g/mol.

Comparative Synthesis Example 7: Preparation of Homopolymer

Polymerization was performed in the same manner as in Synthesis Example 1 except that the composition of the starting material was changed to about 20 g of ε-caprolactone without fumed silica. A number-average molecular weight of the homopolymer thus obtained was about 75,200 g/mol.

Comparative Synthesis Example 8: Preparation of Homopolymer

Polymerization was performed in the same manner as in Synthesis Example 1 except that the composition of the starting material was changed to about 20 g of DLD without fumed silica. A number-average molecular weight of the homopolymer thus obtained was about 66,800 g/mol.

Compositions and molecular weights of the organic-inorganic composite particles and polymers prepared in Synthesis Examples 1 to 10 and Comparative Synthesis Examples 1 to 8 are summarized in Table 1 below.

TABLE 1

| | Configuration of organic-inorganic composite particles | | (Co)polymer molecular weight | |
|---|---|---|---|---|
| | Core | Coating layer | $M_n$ | $M_w$ |
| Synthesis Example 1 | Silica 3 wt % Silica particle diameter ~7 nm | PCL(polycaprolactone) 75 wt %- r-PDLA(poly-D-lactide) 22 wt % Random colpoymer | 38,000 | 69,100 |
| Synthesis Example 2 | Silica 3 wt % Silica particle diameter ~7 nm | PCL(polycaprolactone) 50 wt %- r-PDLA(poly-D-lactide) 47 wt % Random colpoymer | 40,600 | 72,300 |
| Synthesis Example 3 | Silica 3 wt % Silica particle diameter ~7 nm | PCL(polycaprolactone) 25 wt %- r-PDLA(poly-D-lactide) 72 wt % Random colpoymer | 34,500 | 63,100 |
| Synthesis Example 4 | Silica 3 wt % Silica particle diameter ~7 nm | PDLA(poly-D-lactide) 47 wt %- b-PCL(polycaprolactone) 50 wt % Block copolymer | 40,300 | 73,400 |
| Synthesis Example 5 | Silica 3 wt % Silica particle diameter ~7 nm | PDLA(poly-D-lactide) 22 wt %- b-PCL(polycaprolactone) 75 wt % Block copolymer | 46,200 | 82,700 |
| Synthesis Example 6 | Silica 3 wt % Silica particle diameter ~7 nm | PDLA(poly-D-lactide) 72 wt %- b-PCL(polycaprolactone) 25 wt % Block copolymer | 32,700 | 58,900 |
| Synthesis Example 7 | Silica 3 wt % Silica particle diameter ~7 nm | PCL(polycaprolactone) 50 wt %- b-PDLA(poly-D-lactide) 47 wt % Block copolymer | 40,000 | 70,500 |
| Synthesis Example 8 | Silica 3 wt % Silica particle diameter ~7 nm | PCL(polycaprolactone) 75 wt %- b-PDLA(poly-D-lactide) 22 wt % Block copolymer | 51,600 | 84,200 |
| Synthesis Example 9 | Silica 3 wt % Silica particle diameter ~7 nm | PCL(polycaprolactone) 25 wt %- b-PDLA(poly-D-lactide) 72 wt % Block copolymer | 47,700 | 90,100 |
| Synthesis Example 10 | Silica 3 wt % Silica particle diameter 200~300 nm | PCL(polycaprolactone) 75 wt %- r-PDLA(poly-D-lactide) 22 wt % Random copolymer | 64,100 | 109,000 |
| Comparative Synthesis Example 1 | Silica 3 wt % Silica particle diameter ~7 nm | PDLA(poly-D-lactide) 97 wt % Homopolymer | 41,000 | 70,600 |
| Comparative Synthesis Example 2 | Silica 3 wt % Silica particle diameter ~7 nm | PCL(polycaprolactone) 97 wt % Homopolymer | 67,300 | 110,400 |
| Comparative Synthesis Example 3 | — | PDLA(poly-D-lactide) 25 wt %- r-PCL(polycaprolactone) 75 wt % Random copolymer | 52,000 | 84,700 |
| Comparative Synthesis Example 4 | — | PDLA(poly-D-lactide) 50 wt %- r-PCL(polycaprolactone) 50 wt % Random copolymer | 60,400 | 94,800 |
| Comparative Synthesis Example 5 | — | PDLA(poly-D-lactide) 25 wt %- b-PCL(polycaprolactone) 75 wt % Block copolymer | 49,000 | 88,200 |
| Comparative Synthesis Example 6 | — | PDLA(poly-D-lactide) 50 wt %- b-PCL(polycaprolactone) 50 wt % Block copolymer | 49,200 | 89,600 |
| Comparative Synthesis Example 7 | — | PCL(polycaprolactone) 100 wt % Homopolymer | 75,200 | 120,300 |
| Comparative Synthesis Example 8 | — | PDLA(poly-D-lactide) 100 wt % Homopolymer | 66,800 | 115,000 |

As illustrated in Table 1, conversion rates of the organic-inorganic composite particles of Synthesis Examples 1 to 9 were about 90% or more, and molecular weight distributions ($M_w/M_n$) were in a range of about 1.5 to about 2.0.

Preparation of Thermoplastic Resin Composition and Physical Property Evaluation

Examples 1 to 10 and Comparative Examples 1 and 2

About 100 g of starting materials respectively including the organic-inorganic composite particle compositions prepared in Synthesis Examples 1 to 10 and Comparative Synthesis Examples 1 and 2, a polylactic acid homopolymer (poly-L-lactic acid, PLLA, Nature Works 4032D), ultra-fine talc having an average particle diameter of about 2 μm as a nucleating agent, and a modified vegetable oil (epoxidized soybean oil, ESO, Sajo Haepyo) as a plasticizer for increasing dispersibility during compounding at a weight ratio of about 20:74:2:4 was dry blended. Then, extrudates, which were obtained by performing melt compounding at a processing temperature of about 180° C. to about 220° C. and a screw speed of about 30 rpm to about 100 rpm in a twin screw extruder (Process 11 Haake 11 mm mini twin screw extruder, Thermo Scientific) having a barrel diameter of about 11 mm and a barrel length/barrel diameter (L/D) ratio of about 40, were dried at about 40° C. for about 24 hours in a vacuum of about 5 torr to prepared resin compositions. Compositions of the resin compositions are presented in Table 2 below.

Comparative Examples 3 to 8

Thermoplastic resin compositions were prepared in the same manner as in Example 1 except that the resin compositions without including fumed silica prepared in Comparative Synthesis Examples 3 to 8 were respectively used in Comparative Examples 3 to 8. Compositions of the resin compositions are presented in Table 2 below.

Comparative Example 9

A resin composition of Comparative Example 9 was prepared only using a polylactic acid homopolymer (poly-L-lactic acid, PLLA, Nature Works 4032D) without any additives, and impact strength and heat resistance were measured. A composition of the resin composition is presented in Table 2 below.

Materials Used in Resin Compositions 1) 7 mm fumed silica: Sigma-Aldrich S5130 was a product having an average particle diameter of about 7 nm and was used by drying in a vacuum oven at about 80° C. for about 10 hours or more at a pressure of about 10 torr. 2) 200 to 300 nm fumed silica: Sigma-Aldrich S5505 silica was a product having an average particle diameter of about 200 nm to about 300 nm and was used by drying in a vacuum oven at about 80° C. for about 10 hours or more at a pressure of about 10 torr. 3) D-lactide: it was a product by Shenzhen Esun Industrial Co., Ltd. and has an optical purity of about 99% or more and an acidity of about 0.1 or less.

D-lactide was further purified from the above commercial product for the polymerization. An excessive amount of the commercial product was dissolved in tetrahydrofuran, D-lactide was precipitated by recrystallization by cooling the solution near 0° C., and D-lactide crystals were filtered through a filter. Then, high purity D-lactide having a moisture of about 0.01% or less and an acidity of about 0.01% or less was prepared and used by drying the D-lactide crystals in a vacuum oven at about 40° C. for about 10 hours or more at a pressure of about 10 torr. 4) ε-caprolactone: a Sigma-Aldrich 704067 product was used by adding 1% of calcium hydride ($CaH_2$) at room temperature, stirred for about 10 hours, and then purified by vacuum distillation to have a moisture of about 0.01% or less and a purity of about 99.9% or more. 5) PLLA: Nature Works 4032D was obtained and used as it is. 6) talc: ultra fine talc having an average particle diameter of about 2 microns or less was used. 7) epoxydized soybean oil (ESO): soybean oil having an epoxy group content of about 4% or more manufactured by Sajo Haepyo was used.

Preparation of Izod Impact Strength Specimens

Specimens (about 64 mm (length)×about 12 mm (width)×about 3 mm (depth)) for Izod test according to ASTM D256 were prepared from the extrudates, as the thermoplastic resin compositions, by using a molding apparatus (Haake Minijet Injection Molding System, Thermo Scientific) under conditions including a resin melt temperature of about 180° C. to about 220° C., an injection pressure of about 500 bar to about 1,000 bar, a mold temperature of about 80° C. to about 100° C., and an injection time of about 300 seconds. Then, notching was performed by using a notching machine by Toyoseiki.

Preparation of Heat Distortion Temperature Specimens

Specimens (about 128 mm (length)×about 12 mm (width)×about 6 mm (depth)) for heat distortion temperature (HDT) test according to ASTM D648 were prepared from the extrudates, as the thermoplastic resin compositions, by using a molding apparatus (Semi Auto Injection Molding System, Toyoseiki) under conditions including a resin melt temperature of about 180° C. to about 220° C., an injection pressure of about 500 bar to about 1,000 bar, a mold temperature of about 80° C. to about 100° C., and an injection time of about 300 seconds.

Evaluation Example 1: Impact Strength Measurement

Izod impact strength was measured by performing a notched Izod impact test according to the ASTM D256 test method. The results thereof are presented in Table 2 below.

Evaluation Example 2: Heat Distortion Temperature Measurement

Heat distortion temperatures at which the specimens deflected by about 0.25 mm were measured according to the ASTM D648 test method under a load of about 0.45 MPa while increasing the temperature from room temperature at a rate of about 2° C./min. The results thereof are presented in Table 2 below.

TABLE 2

| | Resin composition [wt %] | | | | Physical properties | |
|---|---|---|---|---|---|---|
| | PLLA (4032D) | Organic-inorganic composite particles | Plasticizer | Nucleating agent | IZOD impact resistance [J/m] | HDT type B (0.45 MPA) [° C.] |
| Example 1 | 74 | (Synthesis Example 1) 20 | 4 | 2 | 464 | 85 |
| Example 2 | 74 | (Synthesis Example 2) 20 | 4 | 2 | 260 | 98 |
| Example 3 | 74 | (Synthesis Example 3) 20 | 4 | 2 | 35 | 85 |
| Example 4 | 74 | (Synthesis Example 4) 20 | 4 | 2 | 167 | 108 |
| Example 5 | 74 | (Synthesis Example 5) 20 | 4 | 2 | 220 | 95 |
| Example 6 | 74 | (Synthesis Example 6) 20 | 4 | 2 | 30 | 125 |
| Example 7 | 74 | (Synthesis Example 7) 20 | 4 | 2 | 365 | 115 |

TABLE 2-continued

|  | Resin composition [wt %] | | | | Physical properties | |
|---|---|---|---|---|---|---|
|  | PLLA (4032D) | Organic-inorganic composite particles | Plasticizer | Nucleating agent | IZOD impact resistance [J/m] | HDT type B (0.45 MPA) [° C.] |
| Example 8 | 74 | (Synthesis Example 8) 20 | 4 | 2 | 410 | 103 |
| Example 9 | 74 | (Synthesis Example 9) 20 | 4 | 2 | 36 | 118 |
| Example 10 | 74 | (Synthesis Example 10) 20 | 4 | 2 | 95 | 75 |
| Comparative Example 1 | 74 | (Comparative Synthesis Example 1) 20 | 4 | 2 | 10 | 135 |
| Comparative Example 2 | 74 | (Comparative Synthesis Example 2) 20 | 4 | 2 | 85 | 85 |
| Comparative Example 3 | 74 | (Comparative Synthesis Example 3) 20 | 4 | 2 | 238 | 73 |
| Comparative Example 4 | 74 | (Comparative Synthesis Example 4) 20 | 4 | 2 | 130 | 75 |
| Comparative Example 5 | 74 | (Comparative Synthesis Example 5) 20 | 4 | 2 | 60 | 74 |
| Comparative Example 6 | 74 | (Comparative Synthesis Example 6) 20 | 4 | 2 | 65 | 95 |
| Comparative Example 7 | 74 | (Comparative Synthesis Example 7) 20 | 4 | 2 | 80 | 70 |
| Comparative Example 8 | 74 | (Comparative Synthesis Example 8) 20 | 4 | 2 | 25 | 120 |
| Comparative Example 9 | 100 | — | — | — | 35 | 55 |

As illustrated in Table 2, Examples 1 to 10 including organic-inorganic composite particles, on which a copolymer coating layer formed of caprolactone and D-lactide was formed, had similar or improved impact resistance and improved heat resistance in comparison to Comparative Example 9, a poly-L-lactide (PLLA) homopolymer.

In particular, Examples 1, 2, 4, 5, 7, and 8 had an impact resistance of about 100 J/m or more and a heat resistance of about 80° C. or more, and both the impact resistance and heat resistance were improved in comparison to the comparative examples.

Further, Comparative Examples 1 and 2, in which polycaprolactone or a poly-D-lactide homopolymer, instead of a copolymer, formed a silica coating layer, had poor impact resistance or heat resistance in comparison to Examples 1, 2, 4, 5, 7, and 8.

Furthermore, Comparative Examples 3 to 8, which include a copolymer formed of caprolactone or D-lactide without including silica, had poor impact resistance or heat resistance in comparison to Examples 1, 2, 4, 5, 7, and 8.

As described above, according to the one or more of the above embodiments of the present invention, impact resistance and heat resistance of a resin composition including a polylactic acid may be improved by including organic-inorganic composite particles in which a copolymer coating layer is formed on a metal or inorganic nanoparticle core.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims. All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A thermoplastic resin composition comprising:
   a polylactic acid; and
   organic-inorganic composite particles,
   wherein the organic-inorganic composite particles comprise an inorganic nanoparticle core and a coating layer comprising a copolymer surrounding the core,
   wherein the copolymer of the coating layer comprises a block copolymer which includes a first polymer block grafted onto the core and a second polymer block linked covalently to the first polymer block,
   wherein the copolymer comprises a first structural unit comprising a lactide or lactic acid and a second structural unit comprising an ester compound that is distinguished from the lactide or lactic acid, and
   wherein the thermoplastic resin composition has an IZOD impact resistance of about 100 J/m or more and a heat distortion temperature of about 80° C. or more.

2. The thermoplastic resin composition of claim 1, wherein the coating layer has a multilayer structure which includes a first layer including the first polymer block and a second layer including the second polymer block.

3. The thermoplastic resin composition of claim 1, wherein the ester compound comprises at least one of a lactone having 4 to 20 carbon atoms, glycolide, 1,3-dioxanone, or 1,4-dioxanone.

4. The thermoplastic resin composition of claim 1, wherein the copolymer comprises about 20 wt % to about 80 wt % of the first structural unit and about 20 wt % to about 80 wt % of the second structural unit based on a total weight of the copolymer.

5. The thermoplastic resin composition of claim 1, wherein the number-average molecular weight of the copolymer is about 10,000 g/mol or more.

6. The thermoplastic resin composition of claim 1, wherein the inorganic-organic nanoparticles comprise inorganic nanoparticle cores that are single metal nanoparticles or metal oxide nanoparticles.

7. The thermoplastic resin composition of claim 1, wherein the inorganic-organic nanoparticles comprise inorganic nanoparticle cores that comprise silicon dioxide ($SiO_2$), titanium dioxide ($TiO_2$), cerium oxide ($Ce_2O_3$), zinc oxide (ZnO), zirconium oxide ($ZrO_2$), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxide(II) ($Fe_3O_4$), iron oxide(III) ($Fe_2O_3$), hafnium oxide ($HfO_2$), lanthanum oxide ($La_2O_3$), magnesium oxide (MgO), neodymium oxide ($Nd_2O_3$), samarium oxide ($Sm_2O_3$), antimony trioxide ($Sb_2O_3$), selenium trioxide ($Se_2O_3$), tin oxide ($SnO_2$), tungsten trioxide ($WO_3$), or combination thereof.

8. The thermoplastic resin composition of claim 1, wherein the particle diameter of the inorganic nanoparticle cores are less than about 100 nm.

9. The thermoplastic resin composition of claim 1, wherein the inorganic nanoparticle core constitutes about 0.1 wt % to about 10 wt % of the total weight of the organic-inorganic composite particle.

10. The thermoplastic resin composition of claim 1, wherein the thermoplastic resin composition comprises about 5 wt % to about 40 wt % of the organic-inorganic composite particles based on the total weight of the thermoplastic resin composition.

11. The thermoplastic resin composition of claim 1, further comprising a plasticizer.

12. The thermoplastic resin composition of claim 11, wherein the plasticizer comprises vegetable oil.

13. The thermoplastic resin composition of claim 1, further comprising a nucleating agent.

14. The thermoplastic resin composition of claim 1, wherein the composition comprises about 40 wt % to about 93 wt % of the polylactic acid, about 5 wt % to about 40 wt % of the organic-inorganic composite particles, about 1 wt % to about 10 wt % of a plasticizer, and about 0.1 wt % to about 10 wt % of a nucleating agent based on a total weight of the thermoplastic resin composition.

15. A molded article comprising the thermoplastic resin composition of claim 1.

* * * * *